US011834348B2

(12) United States Patent
Ng et al.

(10) Patent No.: US 11,834,348 B2
(45) Date of Patent: Dec. 5, 2023

(54) CYCLONE ASSISTED DESALINATION SYSTEM AND METHOD

(71) Applicant: KING ABDULLAH UNIVERSITY OF SCIENCE AND TECHNOLOGY, Thuwal (SA)

(72) Inventors: Kim Choon Ng, Thuwal (SA); Muhammad Burhan, Lahore (PK); Muhammad Wakil Shahzad, Rahim Yar Khan (PK); Doskhan Ybyraiymkul, Almaty (KZ)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 15/734,082

(22) PCT Filed: May 21, 2019

(86) PCT No.: PCT/IB2019/054196
§ 371 (c)(1),
(2) Date: Dec. 1, 2020

(87) PCT Pub. No.: WO2019/239234
PCT Pub. Date: Dec. 19, 2019

(65) Prior Publication Data
US 2021/0221704 A1 Jul. 22, 2021

Related U.S. Application Data

(60) Provisional application No. 62/770,414, filed on Nov. 21, 2018, provisional application No. 62/683,136, filed on Jun. 11, 2018.

(51) Int. Cl.
*C02F 1/04* (2023.01)
*C02F 1/14* (2023.01)
(Continued)

(52) U.S. Cl.
CPC ............ *C02F 1/043* (2013.01); *B01D 1/0047* (2013.01); *B01D 1/0052* (2013.01);
(Continued)

(58) Field of Classification Search
CPC ........ B01D 1/26; B01D 3/065; B01D 1/0035; C02F 1/04–18
See application file for complete search history.

(56) References Cited

U.S. PATENT DOCUMENTS 3,607,663 A * 9/1971 Vandenberg .............. C02F 1/04
202/173
5,078,880 A 1/1992 Barry
(Continued)

FOREIGN PATENT DOCUMENTS

CN 206279038 U 6/2017
EP 3153235 A1 4/2017
(Continued)

OTHER PUBLICATIONS

Zhu, Jingwei & Elbel, Stefan. (2016). A New Control Mechanism for Two-Phase Ejector in Vapor Compression Cycles Using Adjustable Motive Nozzle Inlet Vortex.*
(Continued)

*Primary Examiner* — Jonathan Luke Pilcher
(74) *Attorney, Agent, or Firm* — PATENT PORTFOLIO BUILDERS PLLC

(57) ABSTRACT

A cyclone-assisted distillation system including an energy supply system configured to generate water vapor; a cyclone-generating device configured to generate a vortex with the water vapor received from the energy supply system, the vortex generating a water vapor jet; and a distillation system configured to generate distilled water from saltwater, based on a steam jet obtained from (1) the
(Continued)

water vapor of the energy supply system and (2) the water vapor jet from the cyclone-generating device.

12 Claims, 9 Drawing Sheets

(51) Int. Cl.
    *B01D 1/26*     (2006.01)
    *B01D 1/00*     (2006.01)
    *B01D 3/06*     (2006.01)
    *B01D 3/10*     (2006.01)
    *B01D 5/00*     (2006.01)
    *C02F 1/06*     (2023.01)
    *C02F 103/08*     (2006.01)

(52) U.S. Cl.
    CPC .......... *B01D 1/0064* (2013.01); *B01D 3/065* (2013.01); *B01D 3/105* (2013.01); *B01D 5/0006* (2013.01); *B01D 5/006* (2013.01); *B01D 5/0045* (2013.01); *C02F 1/041* (2013.01); *C02F 1/06* (2013.01); *C02F 1/14* (2013.01); *B01D 1/26* (2013.01); *C02F 2103/08* (2013.01); *C02F 2201/009* (2013.01)

(56) References Cited

U.S. PATENT DOCUMENTS

| | | | | |
|---|---|---|---|---|
| 8,661,819 B2* | 3/2014 | Schubert | .............. | C02F 1/048 60/671 |
| 8,741,101 B2* | 6/2014 | Duesel, Jr. | .............. | C02F 1/042 261/78.2 |
| 8,776,522 B2* | 7/2014 | Schubert | .............. | C02F 1/048 60/671 |
| 9,790,103 B2* | 10/2017 | Alhazmy | .............. | B01D 3/065 |
| 9,862,620 B2* | 1/2018 | Schubert | .............. | F01K 23/10 |
| 9,988,283 B2* | 6/2018 | Schubert | .............. | C02F 9/00 |
| 10,081,556 B2* | 9/2018 | Schubert | .............. | C02F 1/048 |
| 10,472,256 B2* | 11/2019 | Schubert | .............. | F01K 17/00 |
| 10,532,936 B2* | 1/2020 | Al-Azazmeh | .............. | B01D 5/006 |
| 2011/0023485 A1 | 2/2011 | Schubert | | |
| 2014/0290247 A1* | 10/2014 | Mishima | .............. | F03G 6/067 60/641.9 |
| 2015/0336807 A1 | 11/2015 | Alhazmy | | |

FOREIGN PATENT DOCUMENTS

| | | |
|---|---|---|
| WO | 2004014802 A1 | 2/2004 |
| WO | 2018005648 A1 | 1/2018 |

OTHER PUBLICATIONS

Zhihao Pan, C.Y. Zhao, Dehydration/hydration of MgO/H2O chemical thermal storage system, Energy, vol. 82, 2015, pp. 611-618, ISSN 0360-5442, https://doi.org/10.1016/j.energy.2015.01.070.*
International Search Report in corresponding/related International Application No. PCT/IB2019/054196, dated Sep. 5, 2019.
Written Opinion of the International Searching Authority in corresponding/related International Application No. PCT/IB2019/054196, dated Sep. 5, 2019.
First Examination Report in corresponding/related Saudi Arabian Application No. 520420760, dated Mar. 28, 2022.

* cited by examiner

CYCLONE ASSISTED DESALINATION SYSTEM AND METHOD

CROSS-REFERENCE TO RELATED APPLICATIONS

This application is a U.S. National Stage of International Application No. PCT/IB2019/054196, filed on May 21, 2019, which claims priority to U.S. Provisional Patent Application No. 62/683,136, filed on Jun. 11, 2018, entitled "ENHANCED CYCLONE FOR SEAWATER DESALINATION: —AN INNOVATIVE SOLAR-DRIVEN SUSTAINABLE WATER SOLUTION WITH CHEMISORPTION STORAGE FOR ALL DAY OPERATION," and U.S. Provisional Patent Application No. 62/770,414, filed on Nov. 21, 2018, entitled "CYCLONE ASSISTED DESALINATION SYSTEM AND METHOD," the disclosures of which are incorporated herein by reference in their entirety.

BACKGROUND

Technical Field

Embodiments of the subject matter disclosed herein generally relate to a system for seawater desalination, and more specifically, to a uninterrupted solar-driven, cyclone-enhanced, seawater desalination system with multi-stage distillation.

Discussion of the Background

The world water demand is projected to increase more than 55% by 2050, mainly due to the high GDP and population growth rates. One solution to this problem, as the fresh water resources are limited or being depleted, is seawater desalination, which offers a reliable potable water source. However, this solution is known to consume large amounts of energy for treating the impaired water. Currently, the seawater desalination processes consume about 76 TWh annually, less than 0.6% of the global electricity production. The Gulf countries (GCC) are set to ramp up their fossil fuel operated desalination infrastructure to several folds, from the current production capacity to meet the fresh water demand. For example, Saudi Arabia consumes more than 300,000 barrels of oil for powering the thermally-driven desalination plants, to fulfil most of the daily water demand. To meet the water demand scarcity gap, there is a need to develop energy efficient desalination systems and yet, these systems should operate with minimal pollution to the environment. Innovative and hybridized desalination processes are currently pursued, using a combination of renewable and low-grade energy mix to treat the impaired water for sustainable production of potable water.

On the other hand, the global warming circumstances (e.g., the 1.5° C. rise in the average ambient temperature) is deemed inevitable due to the excessive emission of greenhouse gases from the burning of fossil fuels for industrialization. Hitherto, the sluggish implementation of renewable energy sources can be attributed to their susceptibility to intermittency, low-energy density and localized availability, which makes these energy sources mediocre as compared to the conventional fossil fuel-based sources.

Solar energy constitutes an attractive source of energy because it is both free and renewable. It can deliver thermal heat source at a high temperature by means of a concentrated solar system, which is provided with a "thermic oil" loop to deliver the thermal heat to both a thermal energy storage system (TES), which contains salts of $MgO/Mg(OH)_2$ for dehydration and hydration processes, and to a "kettle" boiler. As the solar energy input can be intermittent at times, due to the weather conditions, and as there is no solar insolation during nocturnal hours, the TES system is implemented with chemisorption energy storage, to restore operation during the non-solar supply intervals. Owing to the high-energy density and capability to store solar energy for a prescribed interval, the size of the TES system is reduced and hence, the use of the chemisoprtion process $MgO/H_2O$ based system is a viable method as a TES. The ad- and de-sorption of water vapor to the salts in these reactions are shown as follows:

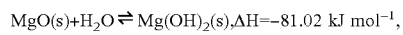

$$MgO(s) + H_2O \rightleftharpoons Mg(OH)_2(s), \Delta H = -81.02 \text{ kJ mol}^{-1},$$

where the accompanied heat release, $\Delta H$, of the chemical reactions is about 81 kJ/mol. Extensive high-temperature waste heat may be stored in this system by the dehydration of $Mg(OH)_2$ (endothermic chemical reaction) and the same heat may be released by the hydration of MgO (exothermic reaction) as high temperature water vapors. These processes are illustrated in FIGS. 1A and 1B, with FIG. 1A showing the process of storing energy by removing the water from the $Mg(OH)_2$ and FIG. 1B showing the process of extracting the stored energy by supplying water droplets to MgO.

A TES based storage energy system that uses the processed noted in FIGS. 1A and 1B offer a steady power supply, which can be used for a sustainable thermal desalination processes, which amounts to 80% of seawater desalination capacity in the GCC region. The dominant role of thermally-driven processes in the GCC countries is due mainly to the challenging feed seawater conditions caused by high silt-density index (SDI), and frequent occurrences of harmful-algae-blooms (HABs) containing health hazard toxins e.g., cyano-bacteria, etc. The occurrence of any of these events in the seawater feed can affect the operation of the pore-based membranes and hence, contribute to the uncertainty in the security of water supply to the region or countries.

For achieving high-performance thermal desalination, the current practice in the industry is to use multi-effect distillation (MED) and multi-stage flashing (MSF) plants, which pack-in a high tube density within the chambers of the evaporators and condensers and hence, increasing the surface area needed for evaporation of seawater and condensation of water vapor. The conventional designs or approaches lead to a high initial capital investment. The inaccessibility in between the tube surfaces within the chambers may result in higher maintenance and pumping costs, despite the fact that the operational cost of thermally-driven processes are generally lower when compared to the membrane-based reverse osmosis (RO) methods. However, the ROs are highly susceptible to the seawater feed conditions as evident by the shut-down of many large scale RO plants along the Gulf in 2008 and 2013, during the infamous HAB events. The scaling and fouling accidents can occur on tube-based chambers when operational temperatures suffered a temperature excursion, for example, >70° C. Such fouling or scaling incident can only be mitigated if the evaporation occurs at lower temperatures.

On the other hand, the conventional falling film evaporation over evaporator tube surfaces is constrained to about 3K to 5K temperature difference for the evaporation and condensation to occur and hence, providing the high heat transfer coefficients needed for the multiple recovery of the latent energy of vapor.

Thus, there is a need for a new method and system that does not use a large amount of energy, is capable of functioning day and night, has a high-efficiency desalination and is not prone to algae events as the existing plants.

SUMMARY

According to an embodiment, there is a cyclone-assisted distillation system that includes an energy supply system configured to generate water vapor; a cyclone-generating device configured to generate a vortex with the water vapor received from the energy supply system, the vortex generating a water vapor jet; and a distillation system configured to generate distilled water from saltwater, based on a steam jet obtained from (1) the water vapor of the energy supply system and (2) the water vapor jet from the cyclone-generating device.

According to another embodiment, there is a method for distilling water with a cyclone-assisted distillation system, the method including receiving saltwater, generating with an energy supply system water vapor, creating a vortex with a cyclone-generating device, by using the water vapor received from the energy supply system, the vortex generating a water vapor jet, injecting a steam jet into a distillation system, wherein the steam jet is being obtained from (1) the water vapor of the energy supply system and (2) the water vapor jet from the cyclone-generating device, and distilling the saltwater to obtain distillated water.

According to still another embodiment, there is a cyclone-assisted distillation system that includes an energy supply system configured to generate water vapor, wherein the energy supply system includes a solar energy harvester device for collecting solar energy and a thermal energy storage system for storing part of the solar energy, a cyclone-generating device configured to generate a vortex with the water vapor received from the energy supply system, the vortex generating a water vapor jet, and a distillation system configured to generate distillated water from saltwater, based on a steam jet obtained from (1) the water vapor of the energy supply system and (2) the water vapor jet from the cyclone-generating device.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to cyclone-assisted distillation systems that use solar energy and chemical stored energy for desalinating the water. However, the embodiments discussed herein are applicable to other configurations, e.g., systems that use other sources of energy.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The present inventors have noted that an intense flash evaporation occurs during a tropical cyclone, when the spinning energy of the vortex greatly reduces the air pressure at the vortex core. When such a vortex core hovers over a seawater surface, the vortex core to seawater interface produces an intense separation of the water vapor from the brine solution, i.e., flashed evaporation caused by a temperature difference between the two layers.

Thus, according to an embodiment, a system has been designed that is solar operated, and uses low-temperature flash evaporation caused by a vortex induced at the surface of a brine pool, which is a sustainable desalination approach that can maximize the utilization of the solar power in the GCC region. In one embodiment, such cyclone-assisted distillation system can be an "out-of-the-box" solution that performs the separation of dissolved salts in the seawater and has high-energy efficiency at seawater concentration up to 120,000 ppm (with axial to radial velocity ratio of 2) or 3 to 4 folds of the normal seawater. The intense separation process is produced using a purpose-built cyclone mechanism, which is powered by a medium to low-temperature steam generated by chemisorption reactions.

Figure 1A:
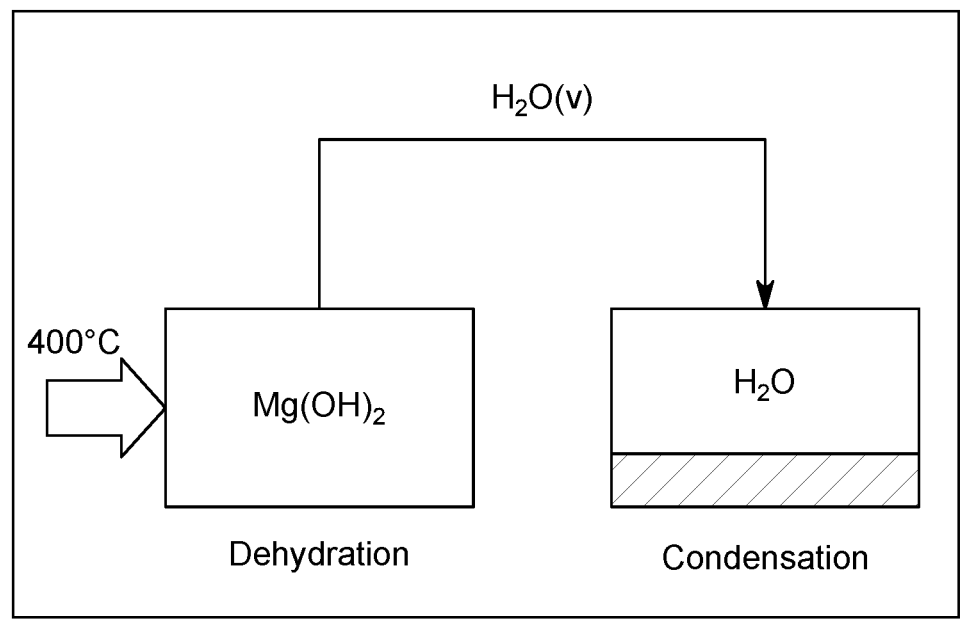
FIGS. 1A and 1B illustrate chemical processes used for storing or releasing energy.
Figure 1B:
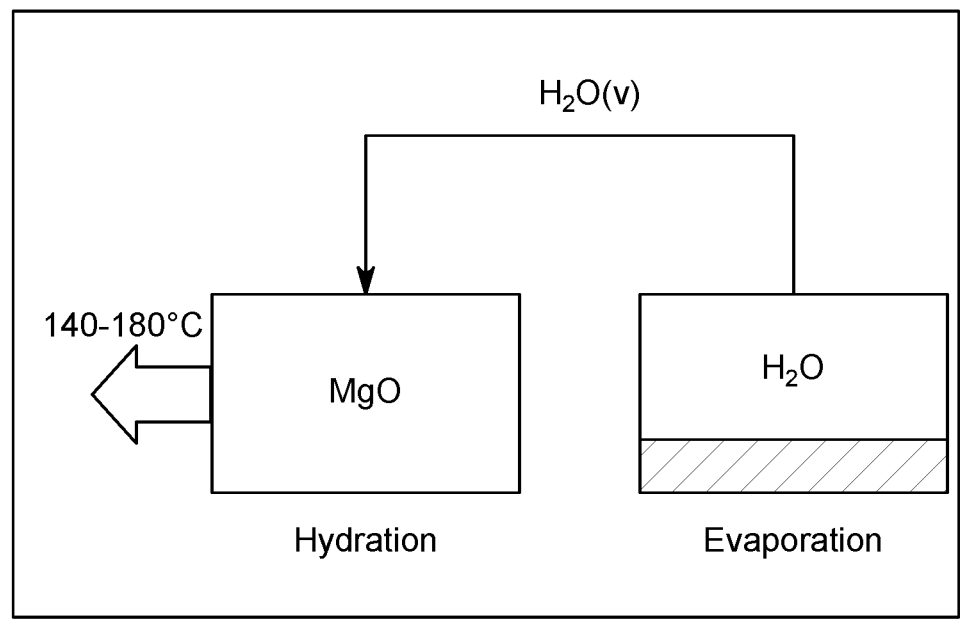
Figure 2:
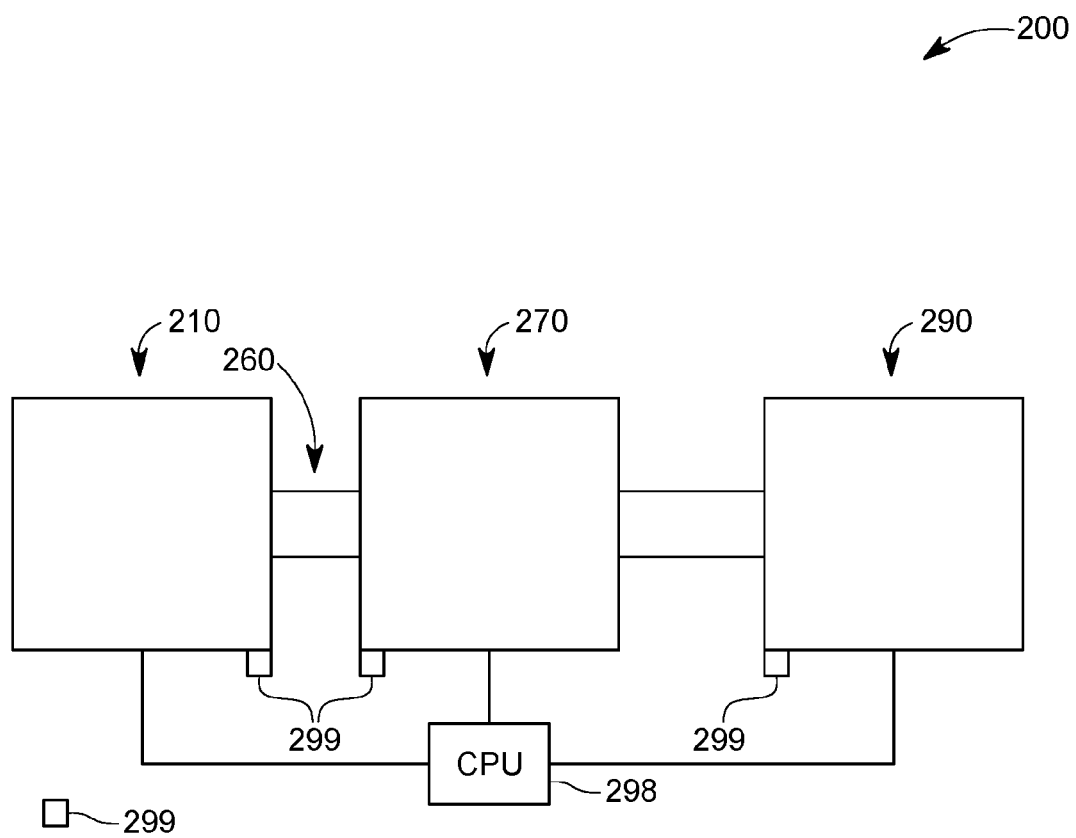
FIG. 2 illustrates a cyclone-assisted distillation system that uses solar power and chemically stored energy.
Figure 3:
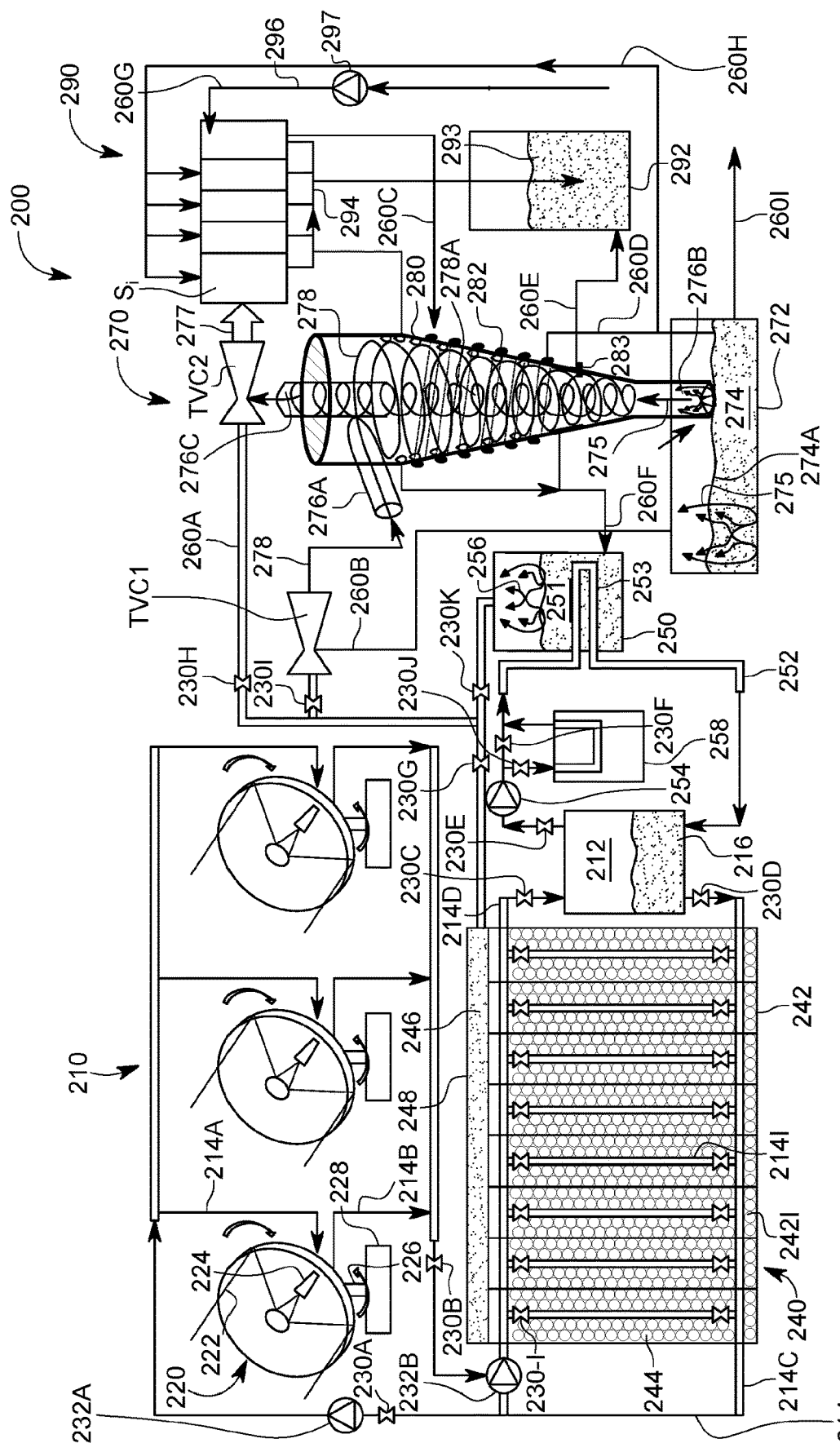
FIG. 3 illustrates the details of the cyclone-assisted distillation system that uses solar power and chemically stored energy.

This cyclone-assisted distillation system is now discussed in more detail with regard to FIGS. 2 and 3. The cyclone-assisted distillation system 200 includes an energy supply unit 210, a cyclone-generating device 270, and a multi-effect distillation (MED) system 290. The system may also include a computing system 298 that is configured to autonomously drive each of these components, and also, to switch from one mode of operation to another, for example, based on readings from one or more sensors 299, as discussed later. A system of pipes 260 connects the energy supply unit 210 to the cyclone-generating device 270 to exchange streams of fluid carrying energy, and the system of pipes 260 also connects the cyclone-generating device 270 to the MED system 290 to exchange various fluids, for example, the evaporated water vapors from the input brine, through the cyclone-generating device 270, to the MED system 290, and also sea water from the MED system 290 to the cyclone-generating device 270.

Figure 4:
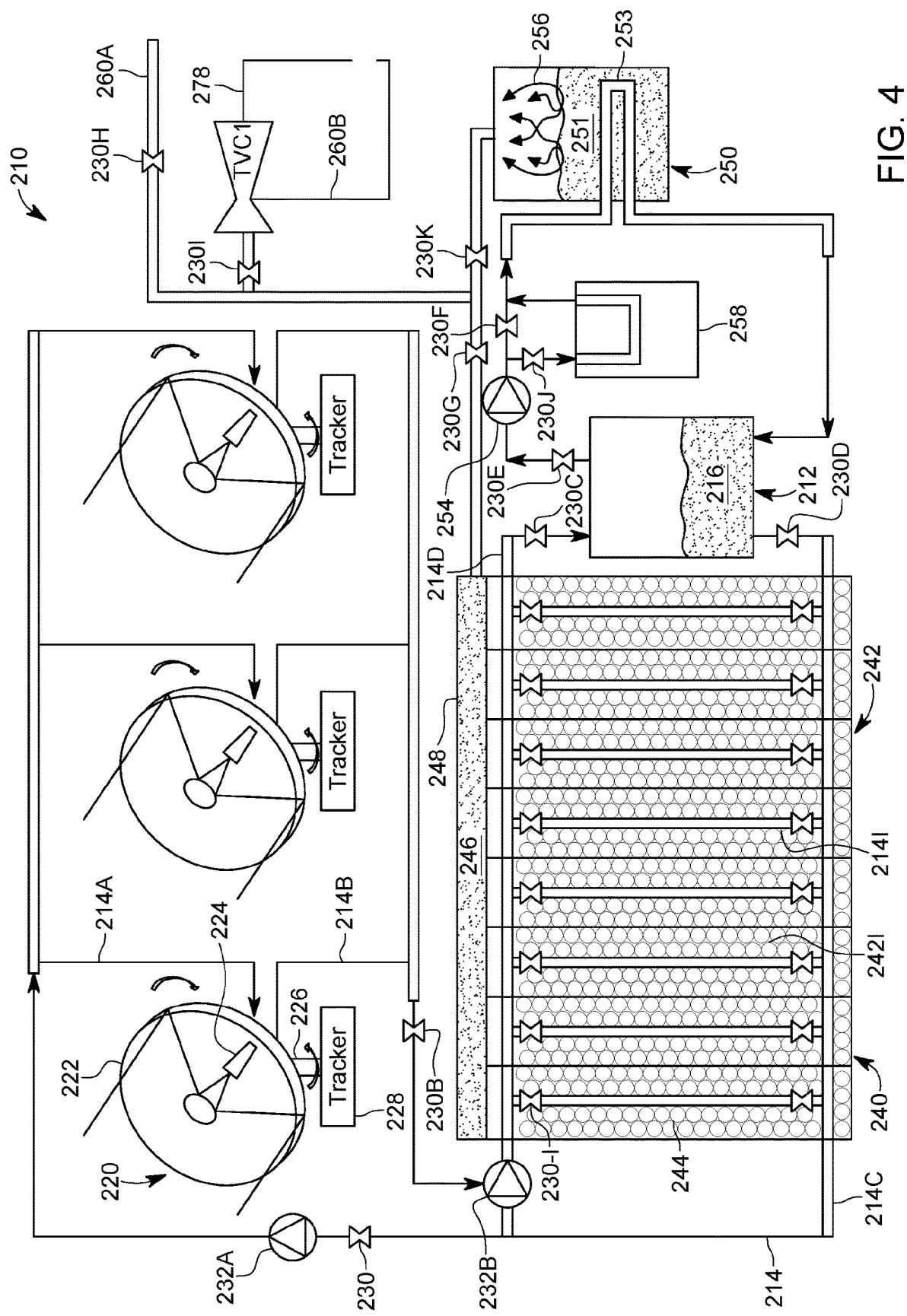
FIG. 4 illustrates the energy supply unit of the cyclone-assisted distillation system.

Each component of the cyclone-assisted distillation system 200 is now discussed with regard to FIGS. 3-6. The energy supply unit 210 has two working modes, a diurnal mode (when solar energy is directly available from the sun) and a night mode (when no solar energy is directly available from the sun). First, the operation of the system is discussed for day conditions, i.e., when the solar energy is available directly from the sun. The energy supply unit 210 is configured to heat a thermal oil (for example, at about 400+/−20° C.) and to use it for a dehydration process and also for generating water vapors. FIGS. 3 and 4 shows the energy supply unit 210 including a thermal oil tank 212 connected to a closed circuit pipe system 214 that takes the oil 216 to one or more concentrated solar energy harvesters (CSEH) 220. Each CSEH 220 device may include a concentrator 222, that concentrates the solar energy onto an oil filled container 224, for heating the oil. The concentrator 222 and the container 224 may be mounted, via a pole 226, to a tracker system 228. The tracker system 228 may include electronics that is configured to control a position of the concentrator 222 to follow the sun, so that the solar rays are incident substantially perpendicular to the surface of the concentrator, to maximize an amount of energy collected by the container 224. The pipe system 214 has a pipe 214A that enters the container 224 and a pipe 214B that exits the container 224 and takes the heated oil back to the tank 212.

A plurality of valves 230A to 230K are used for directing the oil 216 at the desired parts of the energy supply unit 210. For example, during the diurnal mode, the valves 230A-230D are open so that the heated oil from the CSEH 220 travels to the top part 248 of the thermal energy storage (TES) system 240. The TES system 240 holds in an enclosure 242 one or more chemical compounds 244, e.g., MgO or Mg(OH)$_2$. In one embodiment, the enclosure 242 is divided into plural chambers 242I, each chamber containing (1) one or more pipe 214I, which is part of the pipe system 214, (2) part of the chemical compound 244, and (3) a corresponding valve 230-I that can close the corresponding pipe 214I. The heated oil 216 is pumped by pumps 232A and/or 232B to the pipes 214I, through each chamber 242I, to remove the water from chemical compound (e.g., Mg(OH)$_2$ MgO+H$_2$O). In this process, the heat from the heated oil is transformed into chemical energy through the chemical reaction that generates the MgO, thus effectively storing the solar energy in the TES system 240. The released water vapor 246 raises into each of the chambers 242I, and enters a vapor header 248. From here, the water vapor 246 is supplied to the thermal vapor compressor TVC2 along pipe 260A, through valves 230G and 230H, and/or to the TVC1 through valves 230G and 230I. A thermal vapor compressor is a device that receives steam at an input, generates a low pressure suction at its nozzle throat, and outputs the steam at its output, with a lower temperature than the input steam. The energy absorbed by the TVC from the input steam is used to generate the pressure suction at its nozzle throat.

The heated oil 216, having passed through each pipe 214I in each chamber 242I, is collected at a bottom pipe 214C and then forced back, by pump 232A, to the CSEH device 220 for collecting again the solar energy. Also, part of the heated oil 216, when still at the top pipe 214D, is allowed to partially enter the tank 212, through the valve 230C, for maintaining the oil in the tank at a high temperature, for reasons to be discussed next. Part of the oil 216 from the tank 212, is circulated through the valve 230D, back to the bottom pipe 214C and then to the CSEH device 220.

The oil from the tank 212 is also used to heat a boiler 250, which holds its own water 251. The heated oil moves through a pipe 252, which enters inside the boiler 250 through heat exchanger 253, without allowing the oil 216 to interact with the water 251. The pipe 252 is connected with its input and output to the tank 212. Part of the oil 216 from the tank 212 is circulated through the pipe 252, with the help of a pump 254. A valve 230E is provided on the pipe 252, between the tank 212 and the pump 254 and another valve 230F is provided, still on the pipe 252, between the pump 254 and the boiler 250, for controlling the path of the oil. An auxiliary heater 258 may be fluidly inserted along the pipe 252, for further heating the oil in this pipe. A valve 230J may be added to control when the oil is routed from the tank 212 to the additional heater 258. If valve 230F is closed and valve 230J is open, the oil from the tank 212 can be routed to the boiler 250 while being further heated by the auxiliary heater 258. The auxiliary heater 258 may be powered by oil, coal, gas, etc. The auxiliary heater is used to maintain the system running in case that the received solar energy is not enough.

When valves 230e and 230F are open, the heated oil 216 from the tank 212 enters directly into the boiler 250, through the pipe 252, to heat the water 251 and generate water vapors 256. The water vapors 256 from the boiler 250 pass through a valve 230k to arrive to another thermal vapor compressor TVC1. Valve 230I can be opened or closed to allow the water vapor 256 to move toward the TVC1 or TVC2 or both.

Figure 5:
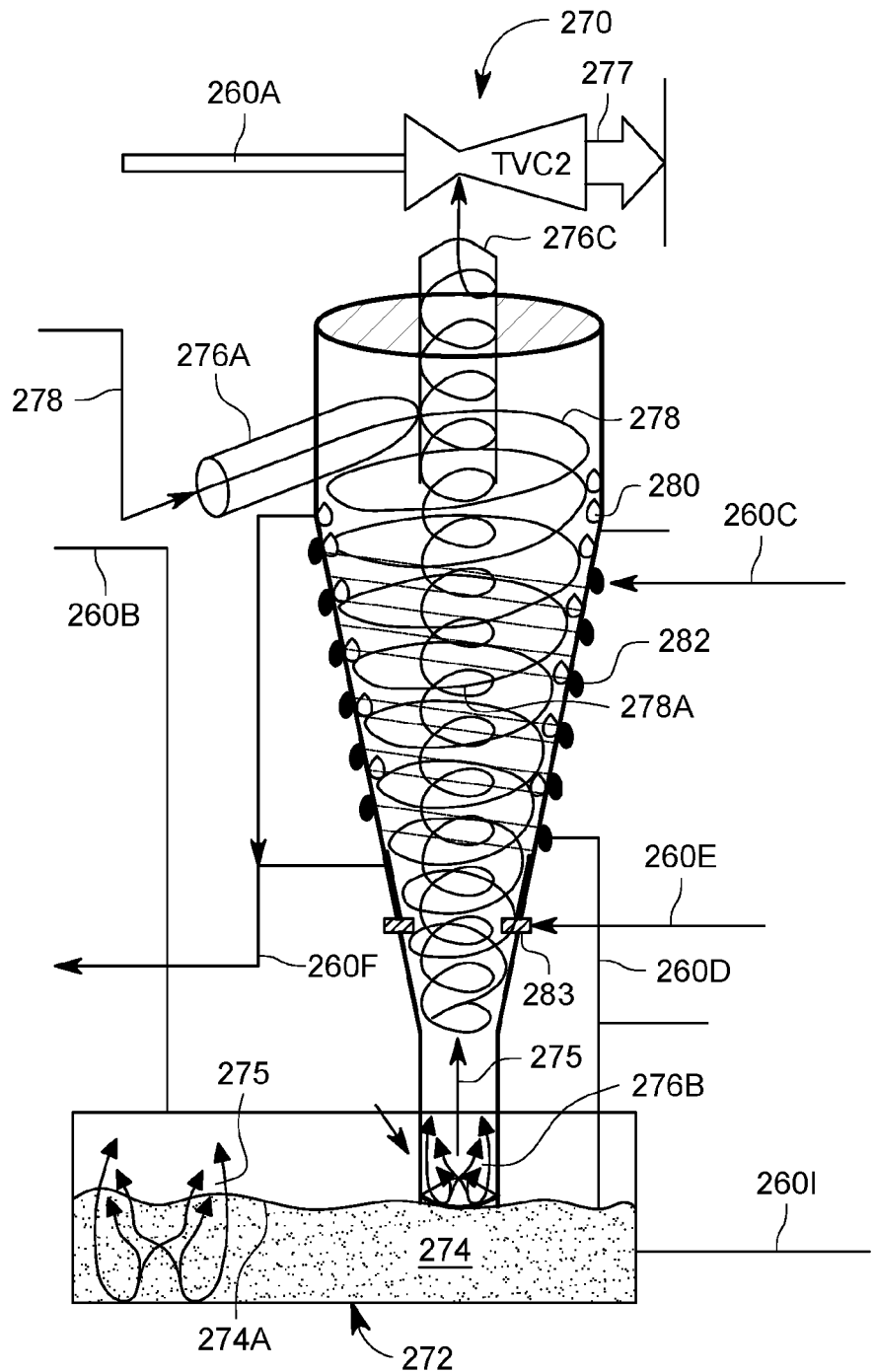
FIG. 5 illustrates the cyclone-generating device of the cyclone-assisted distillation system.

The cyclone-enhanced device 270 is fluidly connected to the TVC1 as now discussed and shown in FIGS. 3 and 5. The cyclone-enhanced device 270 includes an evaporator 272 that holds the saltwater 274 from which fresh water is extracted. Note that the saltwater 274 may be replaced with other water based substances that are desired to be separated into fresh water and salts and/or impurities. The evaporator 272 is fluidly connected to a cyclone device 276, which may be shaped to have a narrowing section (e.g., conical, with a larger diameter at the top and a smaller diameter at the bottom), so to enhance the generation of a cyclone inside. An output from the TVC1 is fluidly connected to an inside of the cyclone device 276, through an inlet 276A, as shown in FIGS. 3 and 5. An input of the TVC1 is connected, as previously discussed, with an output from the boiler 250 and/or an output from the TES system 240 to receive the heated steam. The TVC1 is also connected, through a pipe 260B attached to its nozzle throat, to the evaporator 272, so that vapors 275 from the evaporator 272 are drawn into the TVC1.

The steam output 278 from the TVC1 is injected inside the cyclone device 276 at the inlet 276A, which is disposed as tangential as possible to the internal wall of the cyclone device 276. The high-pressure water vapor 278 injected by the inlet 276A within the cyclone device 276 experiences heat rejection from the internal wall of the cyclone device 276, thus forming minute water droplets 280, which fall down along the internal wall of the cyclone device (see FIG. 5), and are collected on the wall surfaces due to the centrifugal forces at high rotations. The cyclone induced by the high-pressure water vapor 278 generates a low pressure core 278A. The low-pressure core 278A, when aided by the temperature difference between the cyclone core and the seawater interface 274A, generates an intense flash evaporation of the water 274, at the input 276B of the cyclone device 276, thus extracting water vapors from the saltwater and generating a water vapor stream 275 that moves in an upward direction along and inside the cyclone device, toward the TVC2.

The cyclone device 276 has an output 276C, at a top part of the device, which is fluidly connected to the TVC2. The water vapor stream 275, which is caught into the vortex 278A, moves upward, from the evaporator 272, which is positioned at the bottom of the cyclone device 276, to the top of the cyclone device, due to the low pressure generated by the water vapor jet 246 when entering the TVC2. A cooling pipe system 282 is mounted on the exterior wall of the cyclone device 276. The cooling pipe system 282 is fluidly connected to the MED system 290, through a pipe 260C, as discussed later. Saltwater from the MED system 290 is circulated through the cooling pipe system 282, to cool the cyclone device 276, and then discharged into the evaporator 272, through a pipe 260D.

The fresh water 280 formed on the interior wall of the cyclone device 276 is collected inside the cyclone device 276, by a collecting device (e.g., lip) 283, and then partially returned to a distillate tank 292, through a pipe 260E, and partially returned to the interior of the boiler 250, through a pipe 260F. In this way, the vapors from the energy supply system 210 are used by the cyclone-generating device 270 to generate a vortex inside the cyclone device 276, which promotes flash evaporation of the water vapor from the evaporator 272. The water vapor moves on an ascended path to the TVC2, where it is used to generate a steam jet 277. The steam jet 277 is then used by the MED system 290 to desalinate the saltwater.

Figure 6:
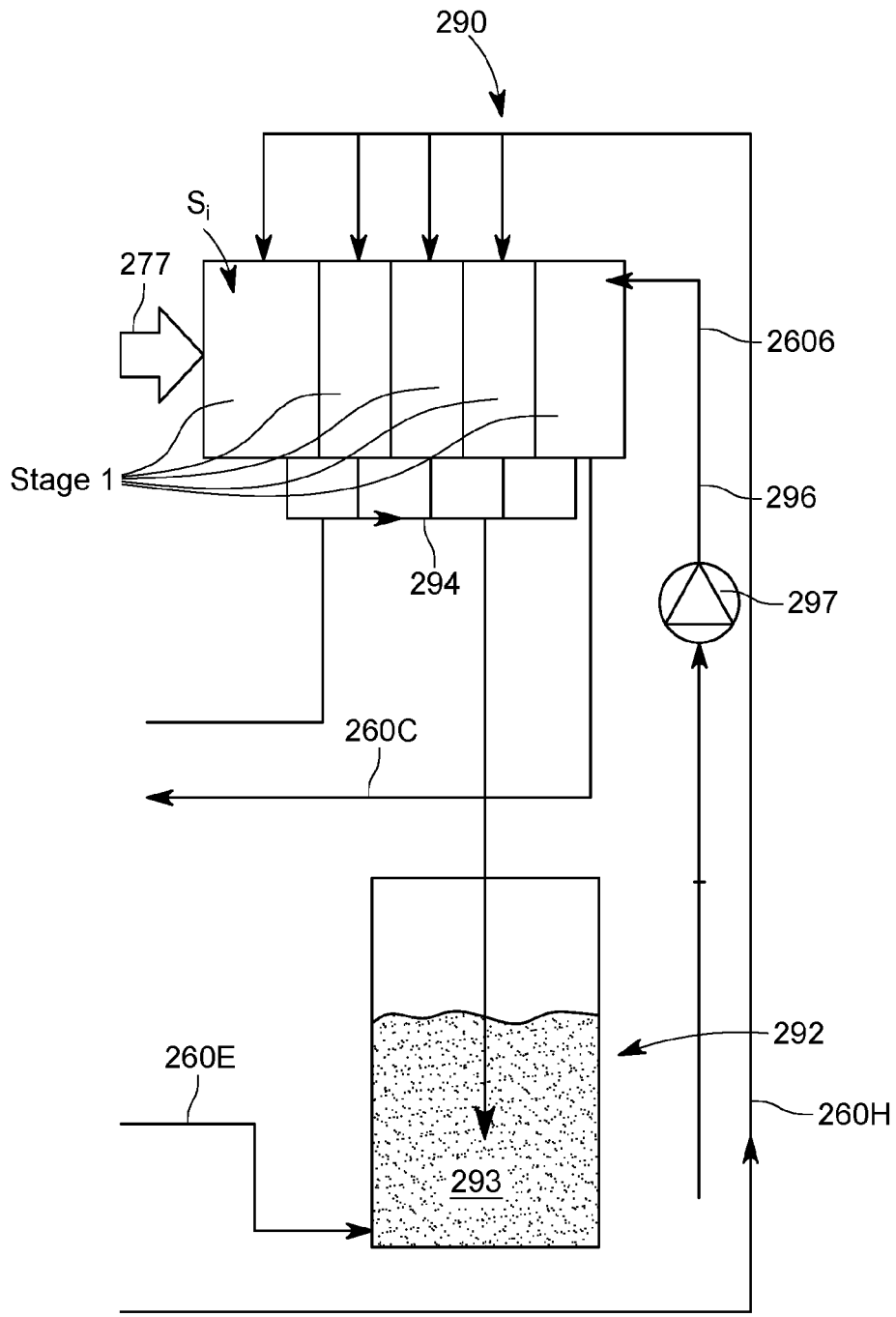
FIG. 6 illustrates the distillation system of the cyclone-assisted distillation system.

The MED system 290 uses a distillation process that consists of multiple stages or "effects." The MED system 290 is illustrated in FIGS. 3 and 6. In each stage Si, the feed water 296 (e.g., saltwater) is supplied through a pipe 260G and heated by steam jet 277 supplied by TVC2, in tubes provided inside the stages $S_i$, usually by spraying the saline water onto the tubes. Some of the water evaporates, and this steam flows into the tubes of the next stage (effect), heating and evaporating more water. Each stage $S_i$ essentially reuses the energy from the previous stage, with successively lower temperatures and pressures after each one. Additionally, between stages, this steam uses some heat to preheat the incoming saline water.

The fresh water 293 generated by the MED system 290 is collected by pipes 294 into the distillate tank 292. In one embodiment, part of the saltwater that flows along pipe 260C is diverted along pipe 282 and pipe 260H back to the MED system 290 for being reused. A pump 297 may be provided on the pipe 260G for moving the saltwater as described above. The brine is discharged through pipe 260I, which extends from the evaporator 272.

The processes that take place in the cyclone-assisted distillation system 200 are now discussed in a unitary way with regard to FIGS. 3-6. The salt water 296 is input along the pipe 260G into the MED system 290. The MED system 290 separates the salts from the saltwater 296, as known in the art, to generate the fresh water, which is collected through pipes 294 into the distillate tank 292. Other desalination systems may be used instead of the MED system 290. The MED system 290 is mainly driven by the steam jet 277. The steam jet 277 is obtained as the output of the TVC2. The steam jet 277 has a temperature less than 60° C. The steam jet 277 is obtained through the mixture of the water vapor 275 from the cyclone device 270 and the water vapor 246 supplied by the energy supply system 210 along pipe 260A.

The cyclone-generating system 270 is configured to receive water vapors from the energy supply unit 210 and to generate a cyclone inside the cyclone device 276, so that flash evaporation is taking place at the surface 274A of the saltwater 274, inside the evaporator 272. In this regard, the water vapors 256 from the boiler 250 are injected at an input of the TVC1, at a first pressure (for example, 2-6 bar). The TVC1 generates a low pressure (e.g., 6 to 10 kPa) at its nozzle throat, and thus, absorbs water vapors 275 through pipe 260B. The combined water vapor is then expelled at the output of the TVC1 as high-pressure water vapor 278, which is input into the cyclone device 276, at its inlet 276A. The high-pressure water vapor 278 forms a cyclone inside the cyclone device 276, which generates a low pressure at the output 276C. Thus, a pressure difference is formed between the input 278B and the output 276C, which creates ideal conditions for flash evaporation at the input 278B, which is located at the interface 274A of the air-saltwater inside evaporator 272. The generated vapor 275 moves upward due to the pressure difference between the input and output of the cyclone device 276, and enters the nozzle throat of the TVC2. In addition, the TVC2 generates a suction pressure at its nozzle throat, further increasing the upward movement of the water vapor stream 275.

Any water droplets 280 that are formed on the interior wall of the cyclone device 276 are collected by the collecting device (e.g., lip) 283, and discharged through pipe 260E into the distillate tank 292 as distillated water 293. The water droplets 280 form because of the lower temperature of the cyclone device 276's wall, which is cooled by the seawater 296 taken from the MED system 290 and circulated around the external wall of the cyclone device, along the pipe system 282.

The heat and pressure necessary for the TVC1 and TVC2 to function for compressing the water vapors are supplied by the energy supply unit 210. This unit includes CSEH units 220 that collect solar energy during the day. The solar energy is stored in the TES system 240 by evaporating the water from the chemical compound stored in the TES system 240. An example of such a chemical compound is fused magnesia, MgO, as discussed above. The MgO generates energy in the presence of water, transforming into magnesium hydroxide $Mg(OH)_2$. This chemical reaction may be used during the night, for generating the necessary energy for the MED system 290. However, during the day, when the solar energy is available, the oil 216 from the tank 212 is circulated through the CSEH 220 and heated. Then, the heated oil 216 is run through the TES system 240 to heat the $Mg(OH)_2$, to remove the water, which is transformed into water vapor 246 and provided to the TVC1 and/or TVC2. Thus, during the day, the solar energy is used (i) to generate the necessary water vapor 246 and, at the same time, (2) to store energy, for the nocturnal mode, by generating the MgO. The heated oil 216 may also be used in the boiler 250, for heating the water 251, to further generate water vapor 256. The water vapor 246 from the TES system 240 may have a temperature of about 400° C. and a pressure of 2 bar while the water vapor 256 from the boiler 250 may have the same pressure of about 2 bar. Those skilled in the art would understand that these numbers would change by changing the sizes of the TES system and boiler.

Figure 7:
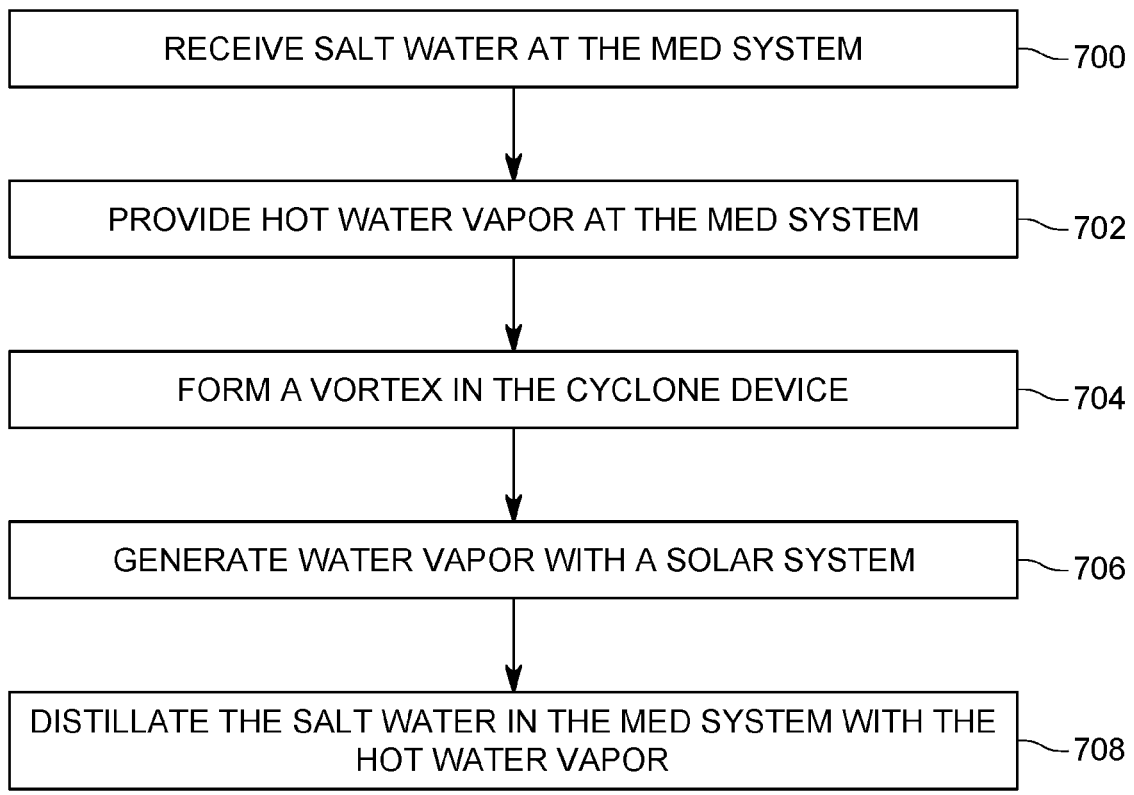
FIG. 7 is a flowchart of a method for desalinating water with the cyclone-assisted distillation system.

A method for operating the cyclone-assisted distillation system 200 is now discussed with regard to FIG. 7. The method includes a step 700 of receiving saltwater at a MED system 290, a step 702 of providing steam jet 277 at the MED system 290, wherein the steam jet 277 includes water vapor 275 from a cyclone-generating device 270 and water vapor 246 generated by an energy supply device 210, a step 704 of forming a vortex in the cyclone-generating device 270 to promote flash evaporation in the cyclone device, a step 706 of generating the water vapor 246 with a concentrated solar energy harvester system 220, and a step 708 of distilling the saltwater in the MED system.

The cyclone-assisted distillation system 200 has been described above as being able to distillate saltwater by harvesting the solar energy during a diurnal mode. However, this system can also continue to distillate the saltwater during a time period when the solar energy is not available, e.g., during the night or cloudy periods (called herein the nocturnal mode). As previously discussed, the TEM system 240 uses the hot oil 216 from the CSEH 220 to remove water from the chemical compound 244, thus performing an endothermic reaction (i.e., using solar energy to remove the water). During this process, the chemical compound 244 is transformed into MgO. During the night or during periods of lack of solar energy, water vapor is supplied to the MgO in the TES system 240 to generate an exothermal reaction (adsorption), which results in heat release. This heat is generated in the TEM system 240. With regard to FIG. 3, valves 203A and 230B are closed to prevent the oil 216 to travel to the CSEH 220, as there is no energy generated at this device. All valves 230-I are open so that the oil circulates through each chamber 242I. The oil is circulated by the pump 232B from the TEM system 240 to the tank 212. Pump 254 then circulates the heated oil 216 from the tank 212 to the boiler 250 for heating the water 251 and generating the water vapor 256. To achieve this, valves 230E and 230F are open. The heated oil is capable of generating water vapor 256 at about 2 bar, and a pressure between 4 and 5 bar. The water vapor 256 (steam) is directed through valve 230K and 230H to drive the TVC2. Note that during the nocturnal mode, the water vapor 256 from the boiler 250 is supplied along pipe 260A to the TVC2. The same water vapor 256 is also supplied, through the valve 230I, to the TVC1 to drive the cyclone device 276 and to the TES system, through valves 230K and 230G, for hydration of MgO. The rest of the operations for distilling the saltwater 296 during the night are similar to those for the diurnal mode described above. By sizing accordingly the TEM system 210, enough energy may be generated during the entire night to have the MED system 290 operate continuously.

The diurnal and nocturnal modes discussed above may be implemented by the computing device 298 (see FIG. 2). For example, the computing device 298 may collect information (temperature, pressure, time of day, light intensity) with one or more sensors 299 and automatically determine when to switch from the diurnal mode to the nocturnal mode and back. Thus, the valves 230A to 230K may all be connected to the computing device 298 so that they are closed or opened automatically. For example, when the computing device 298 determines that there is not enough solar energy to heat the oil 216, with the CSEH device 220, which can be determined based on the time of the day or a measurement from the light intensity sensor, the computing device closes valves 230A and 230B and stops pump 232A and thus, runs the oil 216 only through the TES system 240 or auxiliary heater 258. Further, the computing device can direct the vapors from the boiler 250 to the TES system 240 for hydration of MgO during the nocturnal period to generate heat and direct the vapors from dehydration of $Mg(OH)_2$, during the diurnal period, to the TVC1 and TVC2. The adsorption of water by the compound 244 in the TES system 240 produces an exotherm chemical reaction, which generates the energy necessary for heating the oil 216 circulating through the pipes 214I.

One or more advantages of the cyclone-assisted distillation system 200 are the following:

The intense desalination is performed by a cyclone device, which is devoid of any moving parts. The cyclone device can be readily operated at two operating modes, i.e., diurnal and nocturnal modes.

The proposed system utilizes the chemisorption potential of MgO as a TES system for whole day steady operation, using solar energy. Minimal parasitic electricity is used only for the various pumps. Such a system has a tubeless and low cost design, which eliminates the problems suffered by the complex design of conventional thermal desalination systems.

Water vapor generation, from seawater, is produced at two locations, namely, (1) the suction by the TVC1 and/or TVC2 from the vapor space of the seawater-filled evaporator 272, and (2) the vortex core of the cyclone device 276 where intense water-salt separation occurs.

The water vapor and droplets are condensed by the vortex on the wall due to centrifugal forces, exchanging heat with the seawater feed that circulates on the outer surfaces of the cyclone-generating system 270, and in the condenser part of the MED system 290.

The design of the cyclone-assisted distillation system 200 has neither major moving parts nor any large number of tubes for heat transfer, making it a unique device that has both low capital and minimal maintenance cost.

Figure 8:
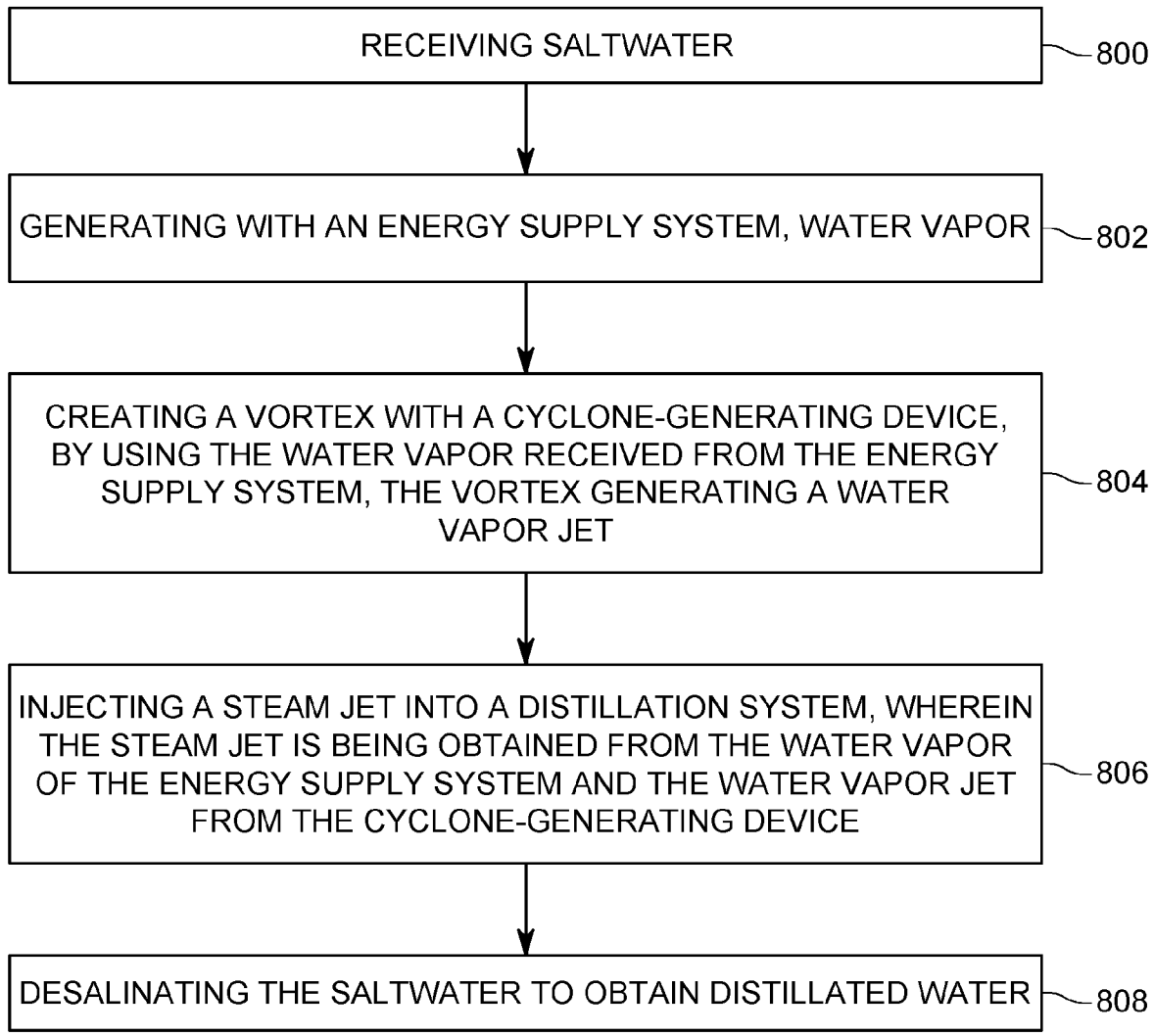
FIG. 8 is a flowchart of another method for desalinating water with the cyclone-assisted distillation system.

A method for desalinating water with a cyclone-assisted distillation system 200 is now discussed with regard to FIG. 8. The method includes a step 800 of receiving saltwater 296, a step 802 of generating with an energy supply system 210, water vapor 246, 256, a step 804 of creating a vortex 278A with a cyclone-generating device 270, by using the water vapor 246, 256 received from the energy supply system 210, the vortex 278A generating a water vapor jet 275, a step 806 of injecting a steam jet 277 into a distillation system 290, wherein the steam jet 277 is obtained from the water vapor 246, 256 of the energy supply system 210 and the water vapor jet 275 from the cyclone-generating device 270, and a step 808 of desalinating the saltwater 296 to obtain distillated water 293.

The method may further include a step of injecting a high-pressure water vapor 278 at the cyclone-generating device 270, to generate the vortex, and/or a step of heating water in a boiler to generate the water vapor, and/or evaporating water in a chemi-sorption reaction of a chemical compound to generate the water vapor, and/or using solar energy to generate the water vapor.

Figure 9:
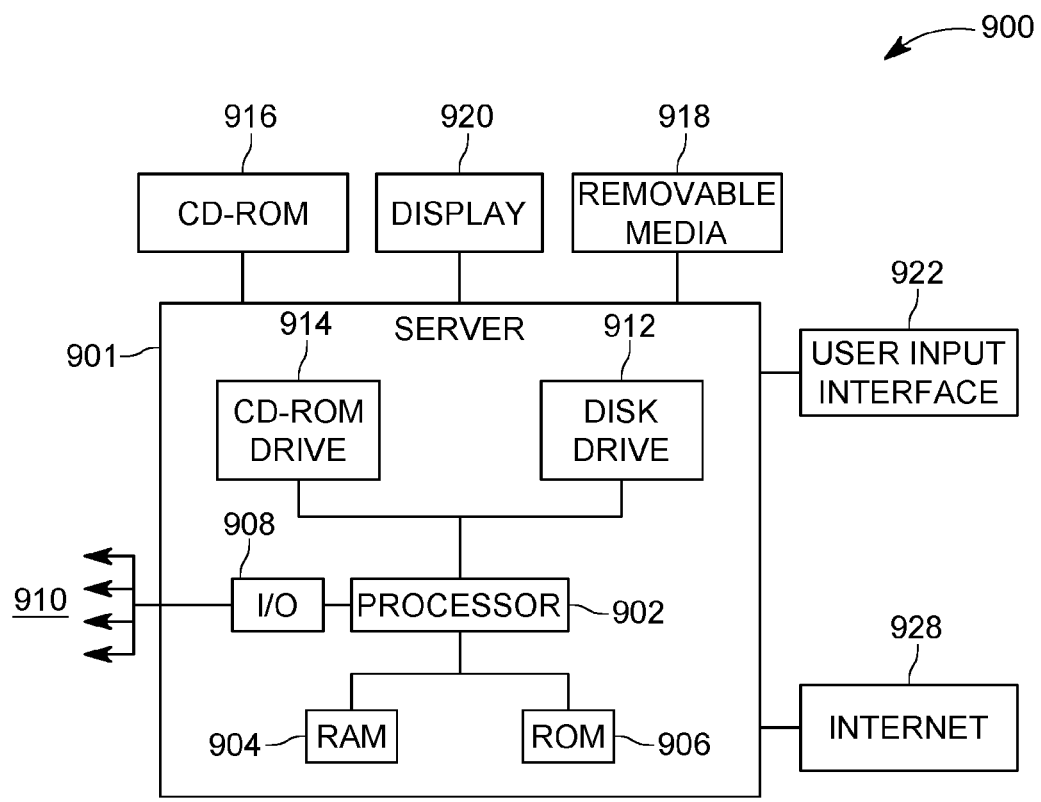
FIG. 9 illustrates a computing system that implements one or more of the methods discussed herein.

The computing device 290 discussed above may be implemented as now discussed with regard to FIG. 9. Computing device 900 may include a server 901. Such a server 901 may include a central processor (CPU) 902 coupled to a random access memory (RAM) 904 and to a read-only memory (ROM) 906. ROM 906 may also be other types of storage media to store programs, such as programmable ROM (PROM), erasable PROM (EPROM), etc. Processor 902 may communicate with other internal and external components through input/output (I/O) circuitry 908 and bussing 910 to provide control signals and the like. Processor 902 carries out a variety of functions as are known in the art, as dictated by software and/or firmware instructions.

Server 901 may also include one or more data storage devices, including hard drives 912, CD-ROM drives 914 and other hardware capable of reading and/or storing information, such as DVD, etc. In one embodiment, software for carrying out the above-discussed steps may be stored and distributed on a CD-ROM or DVD 916, a USB storage device 918 or other form of media capable of portably storing information. These storage media may be inserted into, and read by, devices such as CD-ROM drive 914, disk drive 912, etc. Server 901 may be coupled to a display 920, which may be any type of known display or presentation screen, such as LCD, plasma display, cathode ray tube (CRT), etc. A user input interface 922 is provided, including one or more user interface mechanisms such as a mouse, keyboard, microphone, touchpad, touch screen, voice-recognition system, etc.

The server may be part of a larger network configuration as in a global area network (GAN) such as the Internet 928, which allows ultimate connection to various landline and/or mobile computing devices.

The disclosed embodiments provide methods and systems for desalinating water using a cyclone-generating device. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A cyclone-assisted distillation system comprising:
   an energy supply system including a thermal oil tank configured to hold an oil, a solar concentrator configured to heat the oil, and an enclosure configured to hold a chemical compound, wherein the energy supply system is configured to generate first water vapor by heating the oil within the solar concentrator to dehydrate the chemical compound with the heated oil to generate the first water vapor;
   a cyclone-generating device including,
      a cyclone device having (1) a narrowing body, (2) an inlet port configured to receive a high-pressure water vapor from the energy supply system, (3) an input port at a first end of the narrowing body, and (4) an output port at a second end of the narrowing body, and
      an evaporator enclosure configured to hold saltwater,
      wherein the cyclone device is configured to generate a vortex within the narrowing body, with the high-pressure water vapor, the vortex generating flash evaporation at a surface of the saltwater in the evaporator enclosure so that a second water vapor is generated in the evaporator enclosure and the second water vapor enters the input port and is accelerated within the narrowing body, due to a pressure difference between the input port and the output port, which results in forming a water vapor jet, and the water vapor jet exits the cyclone device at the output port;
   a first thermal vapor compressor, TVC2, having an input port, an output port, and a nozzle throat, and the thermal vapor compressor is configured to receive (1) the water vapor jet at the nozzle throat, and (2) the first water vapor at the input port, and further configured to form a steam jet and release the steam jet at the output port; and
   a distillation system including plural tubes that receive the saltwater from the evaporator enclosure, the distillation system being configured to generate distillated water from the saltwater based on the steam jet obtained from the thermal vapor compressor.

2. The cyclone-assisted distillation system of claim 1, wherein the narrowing body of the cyclone device has a conical shape; and
   wherein the inlet port is oriented to inject the high-pressure water vapor tangential to an interior wall of the cyclone device.

3. The cyclone-assisted distillation system of claim 2, wherein the cyclone-generating device further comprises:
   a collecting device located inside the cyclone device and configured to collect fresh water formed by the high-pressure water vapor inside the cyclone device; and
   a cooling pipe system mounted on an outside of the cyclone device for cooling the high-pressure water vapor.

4. The cyclone-assisted distillation system of claim 3, wherein the distillated water is discharged to a distillate tank of the distillation system and the cooling pipe system receives the saltwater from the distillation system and discharges the saltwater to the evaporator.

5. The cyclone-assisted distillation system of claim 3, further comprising:
   a second thermal vapor compressor, TVC1, connected to the inlet port of the cyclone device, the TVC1 being configured to absorb part of the second water vapors from the evaporator enclosure and to receive the first water vapors from the energy supply system, and to generate the high-pressure water vapor.

6. The cyclone-assisted distillation system of claim 1, wherein the first water vapors are generated by a boiler and a thermal energy storage system, TES, of the energy supply system, and the boiler is heated with hot oil.

7. The cyclone-assisted distillation system of claim 6, wherein the thermal oil tank is fluidly connected to the TES.

8. The cyclone-assisted distillation system of claim 7, wherein the TES is configured to stores the chemical compound that generates heat when reacting with water and absorbs energy when being dried.

9. The cyclone-assisted distillation system of claim 8, wherein the TES is configured such that the oil is passing the TES to receive heat.

10. The cyclone-assisted distillation system of claim 8, wherein the energy supply system further comprises:
    a solar device configured such that the oil is passing the solar device for receiving heat.

11. The cyclone-assisted distillation system of claim 1, further comprising:
    a computing device that switches between a diurnal mode and a nocturnal mode,
    wherein the diurnal mode uses solar energy for (1) generating the first water vapor in the energy supply system and (2) removing water from the chemical compound for storing energy into a thermal energy storage system, TES, and wherein the nocturnal mode uses the energy stored in the TES for generating the first water vapor.

12. A cyclone-assisted distillation system comprising:

an energy supply system configured to generate water vapor, wherein the energy supply system includes a solar energy harvester device for collecting solar energy and a thermal energy storage system for storing part of the solar energy, the solar energy harvester device having an oil filled container and a concentrator that concentrates the solar energy onto the oil filled container, and the thermal energy storage system including an enclosure configured to store one or more chemical compounds;

a cyclone-generating device including, a cyclone device having (1) a narrowing body, (2) an inlet port configured to receive a high-pressure water vapor from the energy supply system, (3) an input port at a first end of the narrowing body, and (4) an output port at a second end of the narrowing body, and an evaporator enclosure configured to hold saltwater, wherein the cyclone device is configured to generate a vortex within the narrowing body, with the high-pressure water vapor, the vortex generating flash evaporation at a surface of the saltwater in the evaporator enclosure so that a second water vapor is generated in the evaporator enclosure and the second water vapor enters the input port and is accelerated within the narrowing body, due to a pressure difference between the input port and the output port, which results in forming a water vapor jet, and the water vapor jet exits the cyclone device at the output port;

a thermal vapor compressor configured to receive the water vapor jet and the first water vapor, and further configured to form a steam jet; and a distillation system including plural tubes configured to receive the saltwater from the evaporator enclosure, the distillation system being configured to generate distillated water from saltwater, based on the steam jet obtained from the thermal vapor compressor.

\* \* \* \* \*